United States Patent [19]

McGehee

[11] Patent Number: 4,598,636

[45] Date of Patent: Jul. 8, 1986

[54] BONE EMULSIFYING APPARATUS

[76] Inventor: Wallace L. McGehee, 1004 W. 88th St. Ter., Kansas City, Mo. 64114

[21] Appl. No.: 752,526

[22] Filed: Jul. 8, 1985

Related U.S. Application Data

[62] Division of Ser. No. 573,304, Jan. 23, 1984, Pat. No. 4,548,829.

[51] Int. Cl.⁴ .......................... A47J 27/00; A23L 1/31
[52] U.S. Cl. ......................................... 99/353; 99/355; 99/403
[58] Field of Search ................. 99/352, 353, 355, 403; 426/518, 519, 520, 805, 806, 807, 523

[56] References Cited

U.S. PATENT DOCUMENTS

| | | | |
|---|---|---|---|
| 2,702,245 | 2/1955 | Mayer | 426/807 |
| 2,873,663 | 2/1959 | Hawk | 99/353 X |
| 2,995,451 | 8/1961 | Leach | 426/523 |
| 3,263,592 | 8/1966 | Hickey | 99/353 X |
| 3,971,306 | 7/1976 | Wiese | 99/353 X |
| 4,186,216 | 1/1980 | Roth | 426/518 |
| 4,307,119 | 12/1981 | Robinson | 426/807 |

FOREIGN PATENT DOCUMENTS 932354  7/1963  United Kingdom ................. 99/353

Primary Examiner—Billy J. Wilhite
Attorney, Agent, or Firm—Schmidt, Johnson, Hovey & Williams

[57] ABSTRACT

In a continuous, ongoing, pressure-cooking operation bones are first ground into particles and then combined with liquid to form a slurry which is pumped into the lower end of an upright cooking tower. As the slurry is forced upwardly through the tower, it is subjected to pressure from the head of liquid maintained in the tower and to high temperatures from a steam jacket surrounding the tower such that the bone particles become softened and further disintegrated. Those products of the cooking process having a lower specific density rise to the top and are drawn off for further processing, while heavier bone particles remain in the lower portion of the tower to be continuously subjected to a turbulent swirling action and to repeated impingements with stationary disintegrating structures whereby to further break up the particles and promote the formation of an emulsion. Products drawn off the tower adjacent the upper regions thereof may be separated into constituent parts and further treated or recirculated to the cooker as necessary or desired.

6 Claims, 8 Drawing Figures

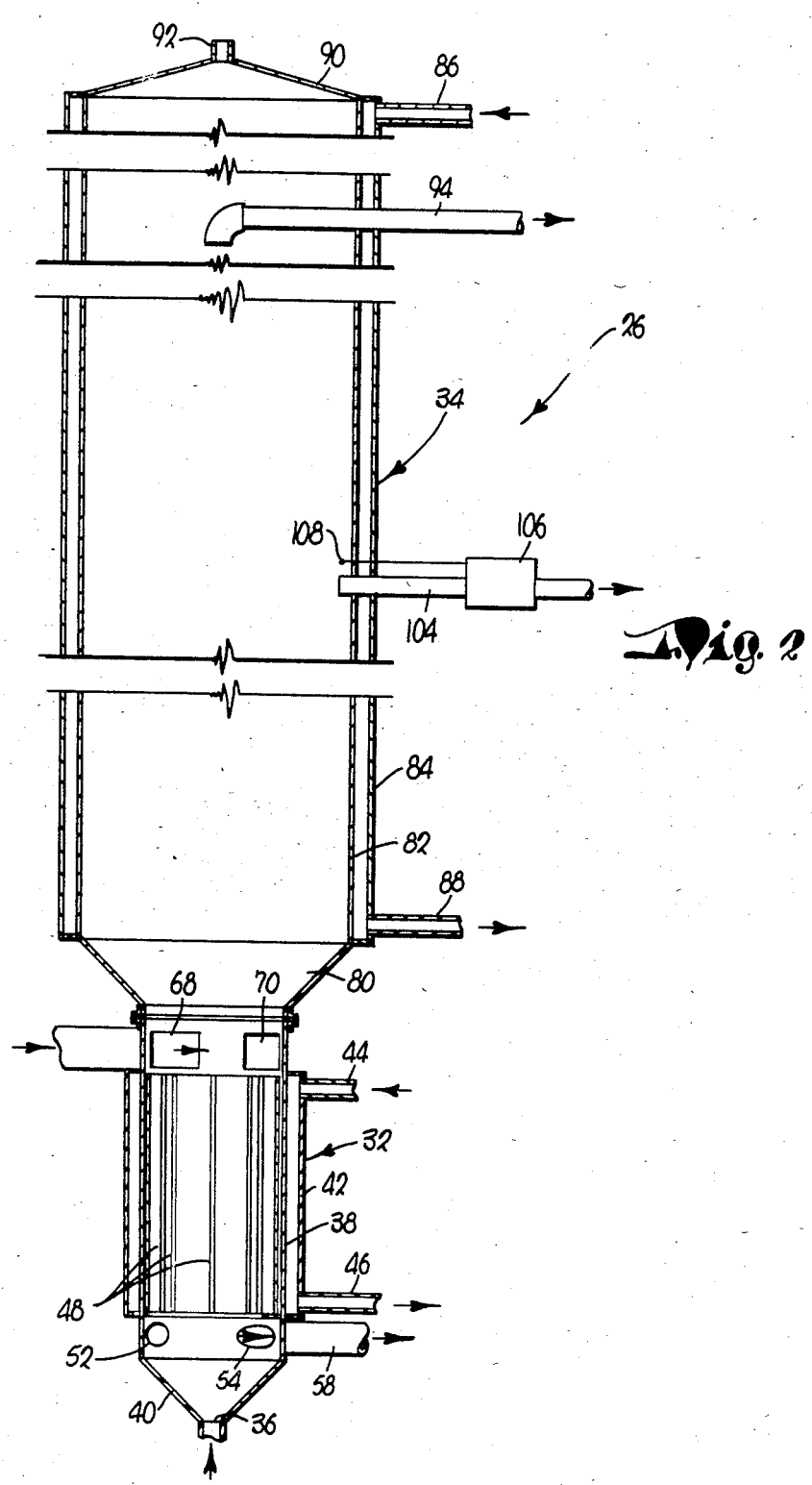

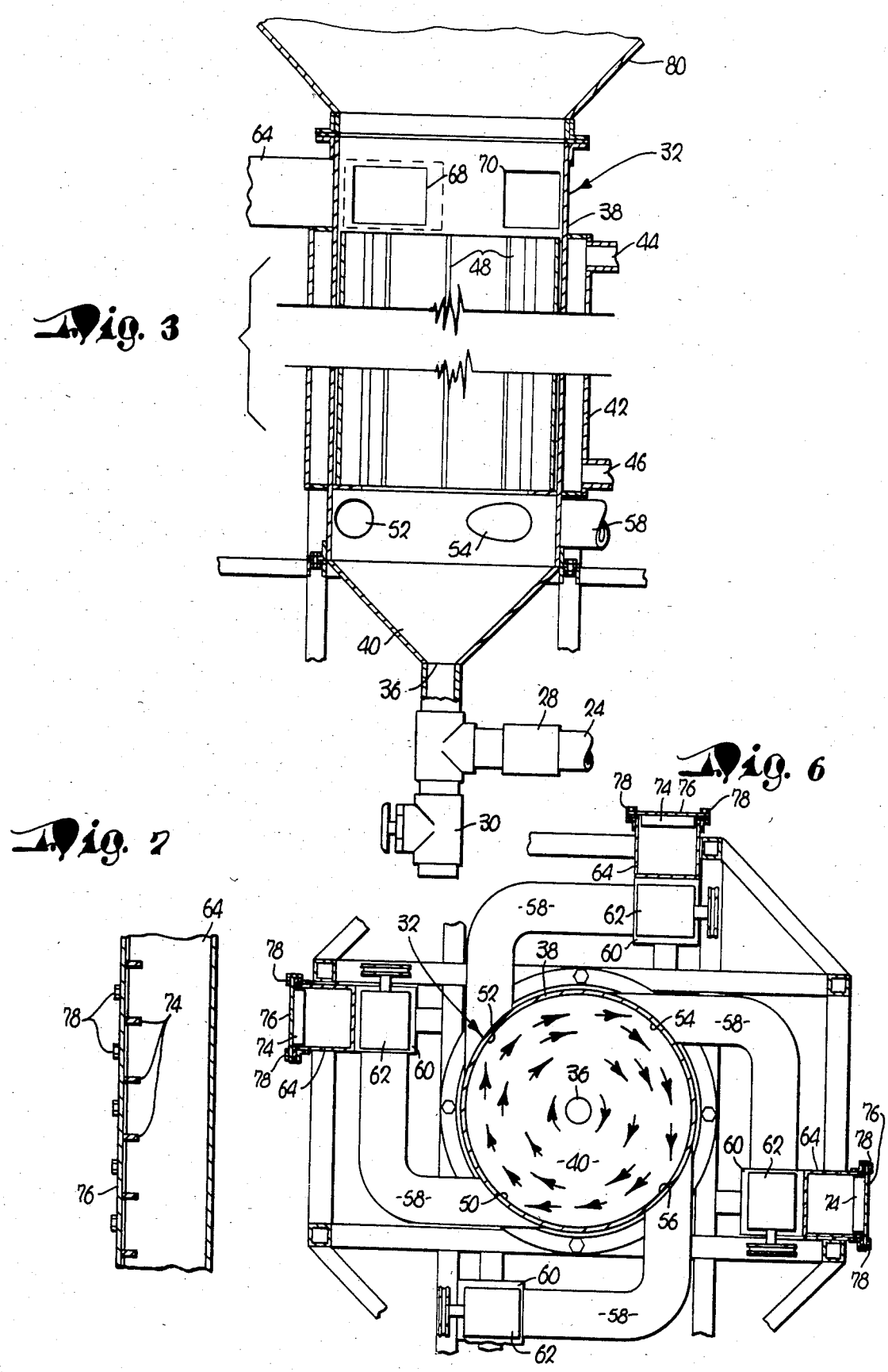

BONE EMULSIFYING APPARATUS

This is a division of application Ser. No. 573,304 filed on Jan. 23, 1984, now U.S. Pat. No. 4,548,829, issued Oct. 22, 1985.

TECHNICAL FIELD

This invention relates to food processing and, more particularly, to an apparatus for preparing animal bones and the like for human consumption as a food additive or in soups and the like.

BACKGROUND AND SUMMARY OF THE PRESENT INVENTION

The nutritional value of animal bones is well known by nutrition experts, yet in spite of their calcium, phosphorus, iron, and trace mineral content, such materials have heretofore been used almost entirely in animal and poultry feeds, rather than as food intended for human consumption.

Accordingly, one important object of the present invention is to provide method and apparatus suitable for producing a low-fat, colloidal or emulsive product having a high nutritive content of protein, calcium, phosphorus, iron, and other minor elements which is useful and desirable for human consumption.

In this respect, the present invention contemplates a continuous, pressure-cooking operation in which the bones are first reduced to particle form and combined with water to produce a slurry which is introduced into the lower end of a cooking tower. As the slurry passes through the cooking tower, it is subjected to intense pressures from the column of liquid thereabove and to high temperatures so that the bone particles are softened and further disintegrated, ultimately forming a colloidal suspension or emulsion which is drawn off adjacent the upper end of the tower. From there the product may be further processed in a variety of ways, if desired, including straining out all bone particles to be utilized in dry form, saving the liquid to be used as a broth, or collecting the emulsion itself and utilizing it in connection with soups and the like.

During its passage through the cooker, the slurry is also subjected to turbulence in the lower end of the tower which promotes further disintegrating of the bone particles, and due to the higher specific gravity of such particles relative to other constituents of the slurry, the particles tend to remain down in the turbulent section of the tower to be exposed to the disintegrating forces in that area while the lighter fraction rises to the top to be drawn off. Preferably, the turbulence may be accomplished by a tangential recirculating system, combined with strategically located fragmenting bars and projections which are impinged by the bone particles during their swirling movements and other travels in the lower tower section.

BRIEF DESCRIPTION OF THE DRAWINGS

FIG. 2 is an enlarged, fragmentary, vertical cross-sectional view of the cooking tower showing details of construction;

FIG. 3 is a further enlarged, fragmentary, vertical cross-sectional view of the tower focusing on the lower end thereof in which the bone particles are fragmented and disintegrated;

FIG. 6 is a fragmentary, transverse cross-sectional view of the lower end of the tower similar to FIG. 5 but taken substantially along line 6—6 of FIG. 4;

FIG. 7 is an enlarged, fragmentary detailed view of one of the recirculating conduits associated with the lower end of the tower illustrating internal fragmenting projections in such conduit.

DETAILED DESCRIPTION

Figure 1:
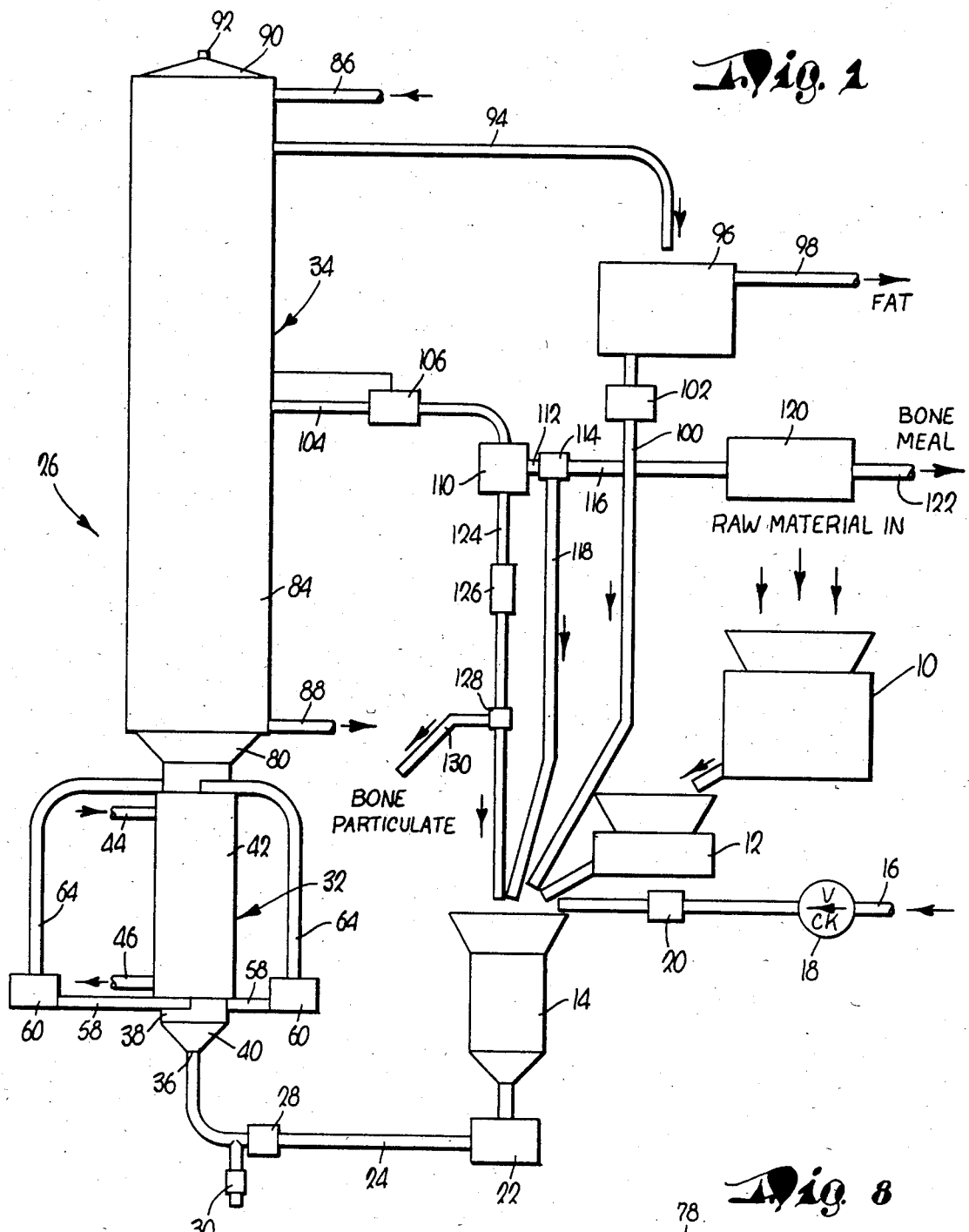
FIG. 1 is a schematic illustration of processing apparatus constructed in accordance with the principles of the present invention and capable of carrying out my novel method.

As illustrated in FIG. 1, the bones are initially delivered by any suitable means into a grinder 10 which pulverizes the bones and reduces them to particles of a certain size. Thereafter, if desired, the particles leaving grinder 10 may be directed to a second grinder 12 where they are reduced to an even smaller size before being discharged into a sump 14. A fresh water supply line 16 having a check valve 18 therein, as well as a flow meter 20, also discharges into the sump 14 for the purpose of combining water with the bone particles to form a slurry.

A pump 22 situated at the lower discharge end of the sump 14 functions to move the slurry out of the sump 14 along pipe line 24 and into the lower end of a cooking tower denoted broadly by the numeral 26. A check valve 28 in pipe line 24 prevents retrograde flow, and a selectively openable drain valve 30 downstream from the check valve 28 is provided to permit draining and cleaning of the pipeline 24 as well as the cooking tower 26.

The tower 26 has two major sections or portions denoted broadly by the numerals 32 and 34 respectively. The lower section 32 has the primary entrance 36 to the cooking tower 26 associated therewith as illustrated in some detail in FIG. 3, it being noted that the entrance 36 is located at the lowermost end of the tower 26. Lower section 32 is tubular in nature, having a cylindrical tapered portion 40 which flares outwardly and upwardly from the entrance 36 to the constant diameter portion 38. A stream jacket 42 having an inlet 44 at its upper end and an outlet 46 at it lower end surrounds the cylindrical portion 38 for heating the interior thereof.

Figure 5:
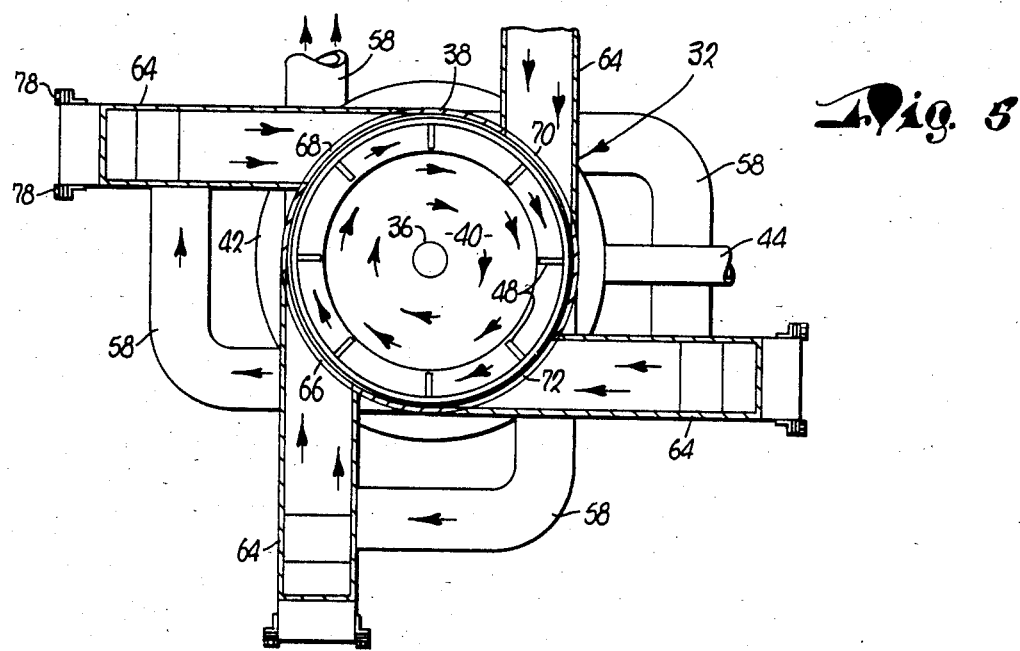
FIG. 5 is a horizontal cross-sectional view thereof taken substantially along line 5—5 of FIG. 4.

The interior of cylindrical portion 38 is provided with a circumferential series of upright fragmenting bars 48 which project generally radially inwardly from the periphery of the section 38 for a short distance as illustrated in FIG. 5. The bars 48 are spaced apart at 45 degree intervals, for example, and may conveniently be constructed as part of an insert sleeve or the like to facilitate periodic removal and replacement as may be necessary for maintenance purposes.

The cylindrical portion 38 is provided at its lower end, below the bars 48, with four tangentially disposed and equally spaced apart outlets 50, 52, 54, and 56, each of which has a right-angle, elbow conduit 58 leading therefrom to a pump 60 driven by a motor 62. The outlet of the pump 60 is in turn communicated with an upright conduit 64 which is in-turned at its upper end to intersect tangentially with the upper end of the cylindrical portion 38 above the bars 48. Such intersection establishes a plurality of inlets 66, 68, 70, and 72 (FIG. 5) whereby material removed from the cylindrical portion 48 at the outlets 50, 52, 54 and 56 may be recirculated back into the portion 38 via the inlets 66, 68, 70, and 72.

Figure 8:
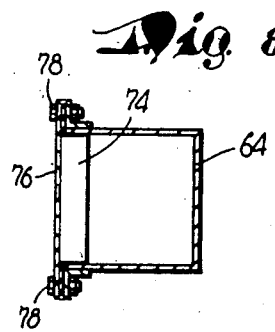
FIG. 8 is a transverse cross-sectional view of the return conduit of FIG. 7 illustrating a fragmenting projection thereof from a different perspective.
Figure 4:
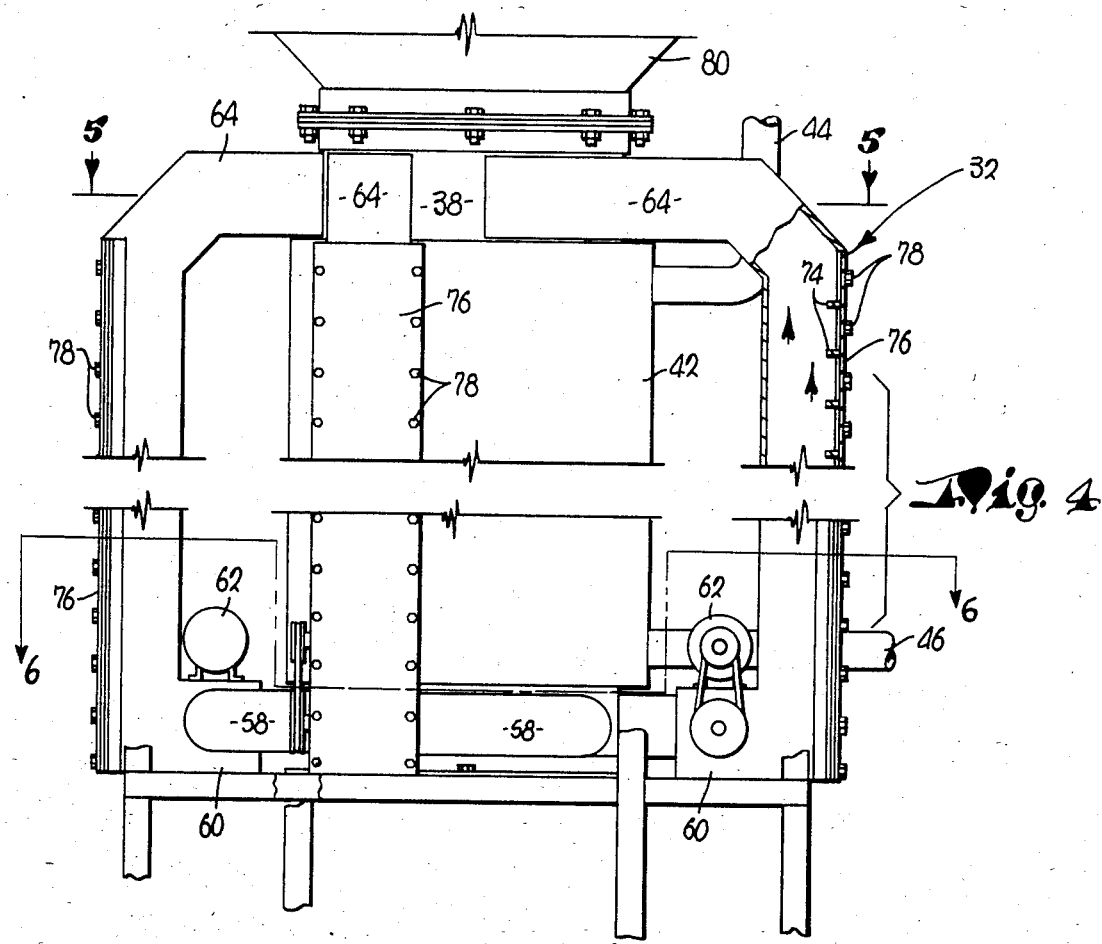
FIG. 4 is a side elevational view thereof with portions partially broken away to reveal internal details of construction.

As illustrated in detail in FIG. 7 and in FIG. 8, each of the upright conduits 64 is provided with a vertical series of bar-like, transversely extending projections 74 which extend out into the flow path of materials through each upright conduit 64 from an exterior wall 76 thereof. Preferably, each wall 76 is detachably removable via releasable fasteners 78 or the like for replacement with a new wall having unworn projections thereon.

The upper section 34 of the tower 26 is slightly larger in diameter than the cylindrical portion 38 of lower section 32, there being an outwardly and upwardly flaring tapered portion 80 which interconnects the lower cylindrical portion 38 with an upper cylindrical portion 82 of the upper section 34. The upper cylindrical portion 82 is also significantly taller than the lower cylindrical portion 38 so as to hold a substantially greater volume of liquid than is possible within the lower cylindrical portion 38.

A stream jacket 84 surrounds the upper cylindrical portion 82, having a steam inlet 86 at its upper end and a steam outlet 88 at its lower end. The uppermost extremity of the cylindrical portion 82 is provided with a dome 90 having a vent 92 for vapor, the vent 92 if desired being connectable to a condenser or the like (not shown) for transforming collected vapor into liquid form and recirculating the same back through the system.

An overflow exit 94 is also provided adjacent the upper end of the upper cooking section 34, such exit 94 leading to a clarifier 96 as illustrated in FIG. 1 which is capable of separating fats which have been released during the process from other constituents. As illustrated, a discharge line 98 leading from the clarifier 96 may be used to convey the separated fats to a remote location for further processing, while a recirculating line 100 from the clarifier 96 and controlled by a flow control valve 102 leads to the sump 14 for direction the non-fat product of the clarifier 96 back into the system for reprocessing. As will hereinafter be explained in more detail, typically the product leaving the cooking tower through line 94 will be highly liquid with a floating fat substance, there being very low solid content under the most ideal working conditions.

Another product exit 104 is provided at a selected location intermediate the upper and lower ends of the upper section 34 for drawing off a denser product than that product normally leaving the upper section 34 via the upper exit line 94. A control valve 106 which is operable to completely open and close the discharge line 104 is itself made responsive to a baume indicator or the like having a probe 108 located within the interior of the cylindrical portion 82 of the upper cooker section 34. As well understood by those skilled in the art, the baume indicator probe 108 will be operable to open and close the valve 106 depending upon the setting which has been selected corresponding to the density of the product contained within upper cooker section 34 at the level of the indicator probe 108.

A screening mechanism 110 located downstream from the control valve 106 is operable to separate larger particles of bone material from the emulsion leaving the cooker through line 104, such larger particles being transferred from the screening mechanism 110 via a line 112 to a two-position selector valve 114 which may be operated to communicate the line 112 with either of two lines 116 and 118. Line 116 leads to a drier 120 in which the bone particles may be dehydrated to a desired extent before being discharged via line 122. On the other hand, the line 118 may be utilized to recycle the larger bone particles back through the system since line 118 delivers such particles into the sump 14 when the selector valve 114 is disposed accordingly.

A line 124 leading from the screening mechanism 110 may be used to draw away the smaller particles of the emulsion and the carrying liquid thereof and to discharge the same into the sump 114 for recycling if desired. On the other hand, a hydrometer 126 in the line 124 may be consulted for an indication of the density of the product flowing through line 124, and if the desired criteria is reached, a selector valve 128 in the line 124 downstream from the hydrometer 126 may be operated to divert the product from the sump 14 to a primary discharge line 130. The finished product leaving through line 130 may then be collected and processed further as desired.

OPERATION

The slurry of water and bone particles pumped from the sump 14 by the pump 22 enters the lower end of the cooking tower 26 via the entrance 36 and is immediately subjected to a turbulent swirling action caused by product which is being continuously recirculated within the lower section 32 of the cooking tower 26. Such swirling action is achieved by virtue of the continuous tangential outflow of product from the lower section 32 via outlets 50, 52, 54, and 56, and by the continuous tangential return thereof into the upper end of lower section 32 via inlets 66, 68, 70, and 72. This turbulent swirling action has the effect of causing the bone particles to violently strike one another and further disintegrate as they are at the same time being cooked by the heat applied through the steam jacket 42.

Moreover, during the swirling movement the larger particles are thrown to the outside of the cooking chamber by centrifugal force and are thus caused to repeatedly impinge against and strike the fragmenting bars 48. This action further promotes disintegration and fragmentation of the bone particles, all of which is enhanced as such particles undergo cooking and become softened and more readily disintegrated.

It will also be appreciated that inasmuch as the cooking tower 26 contains a full column of products, a substantial pressure head is generated against that portion of the product contained within the lower tower section 32, all of which additionally promotes particulate break up and disintegration of the bone materials within the lower section 32. Even that portion of the product circulated up through the upright recirculating conduits 64 is subjected to abrading and impacting forces from the projections 74 located in the exterior wall 76 of such upright conduits 64.

The lighter fraction of the cooking product rises toward the top of the tower 26 while the heavier and less fragmented bone particles remain in the lower, turbulent section 32. As the lighter fraction rises to the top, it continues to be cooked within the upper section 34 until such time as the slurry initially introduced into the tower has been transformed into a fine emulsion. Fats and oils released during the fragmentation and cooking process are free to rise to the very top of the tower 26 where they can be drawn off from the center of the column by the overflow exit 94 and subsequently processed by clarifier 96 as described above. On the other hand, when the emulsion itself reaches the desired density as indicated by the baume indicator probe 108, the valve 106 is opened to likewise open product exit line 104. Once leaving the cooker through line 104, the product may be recirculated to the sump 114 via the line 124 (assuming the valve 128 is in the proper position) if desired, or it can be diverted to the primary discharge 130 for collection of the product and reuse as desired. As earlier described, the larger bone particles may be screened out by screening mechanism 110 and subsequently dried and discharged through line 122 if desired.

It will be noted from the foregoing that the present invention contemplates a continuous, on-going, pressure-cooking process as opposed to a batch-type operation. Moreover, instead of being subjected to pressure in a way that might be expected under a batch-type process, the product which results from the process of the present invention is subjected to pressures from the overhead column of liquid within the cooking tower as the process is continually carried out. Consequently, the advantages of pressure cooking are achieved, but without the disadvantages associated with batch-type operations.

In this respect for example, it will be appreciated that because the operation is continuously ongoing in the present invention, the need for extensive clean-up operations such as would be the case with repeated batch processing is substantially mitigated. Whereas it may be necessary in batch operations to meticulously clean the plumbing systems and processing receptacles between batches, in the present system the continuous presence of product within the system and the continuous flow thereof throughout all portions of the apparatus alleviates the need for such frequent clean up. Consequently, considerable savings may be achieved in terms of down time, labor, and cost of materials used in cleaning.

The present invention is also conducive to carefully controlling the time, temperature, and turbulence factors associated with preparing the end product. In this respect, the rate of flow throughout the system, and particularly the cooking tower 26, can be easily regulated, as can the temperature to which the product is subjected within such tower. Moreover, only those heavier solid bone fragments tending to remain within the lower portion 32 of the tower 26 will be exposed to the substantial turbulent action available by the recirculating lines 58 and 64 of the system, whereas the lighter fraction will necessarily rise to the top of the tower to be drawn off as a finished product.

The present system if also attractive from the standpoint of making it possible to fully recover gelatin associated with the bone particles being processed. Such gelatin has highly beneficial qualities and may be quite readily handled and maintained inasmuch as it will remain in liquid form until removed from the higher temperatures associated with the cooking process.

Also of significance is the fact that water associated with the process is quite easily recovered and recycled, rather than being dumped into a lagoon or the like such as might be more likely to occur in a batch operation. The benefits derived from such recovery and recycling are many and quite significant.

Furthermore, it will be appreciated that the system of the present invention may be used with significant success to produce a low-fat, colloidal product which is high in nutritive content of protein, calcium, phosphorus, iron, and other elements in demand for bone-building diets. This product can be varied in liquid content so as to be highly liquid, semi-solid, or even completely dry. As such, it may be conveniently utilized in soups, stews, prepared foods, sausages, and as an additive in ground beef, to the end that a highly-nutritious food substance heretofore not made available for human consumption can be prepared in such a way that it may be readily incorporated into the human diet.

It will be appreciated that while only a single exemplary embodiment of the present invention has been disclosed hereinabove, various obvious minor modifications and changes may be made in the disclosed embodiment by those skilled in the art without departing from the spirit and scope of the present invention.

I claim:

1. Apparatus for use in emulsifying animal bones and the like in a continuous process comprising:
    means for reducing bones into particles;
    means for combining the bone particles with a liquid to produce a slurry;
    a tubular cooking tower adapted at its lower end to receive the slurry and to subject the same to applied heat as the slurry is passed upwardly through the tower;
    means associated with the tower for subjecting the particles within the slurry to further disintegration as heat is applied; and
    means for drawing off cooked product from the tower above the lower end thereof.

2. Apparatus as claimed in claim 1, wherein said means for subjecting the particles of the slurry to further disintegration includes a plurality of fragmenting bars in a lower portion of said tower and means for swirling the slurry through said bars to impact the particles thereon.

3. Apparatus as claimed in claim 2, wherein said swirling means includes at least one tangentially disposed outlet in said lower portion of the tower, at least one tangentially disposed inlet in the lower tower portion above said outlet, and means for transferring slurry from said outlet to said inlet under pressure.

4. Apparatus as claimed in claim 3, wherein said lower portion of the tower is provided with a primary entrance for the slurry which is disposed below both said inlet and outlet.

5. Apparatus as claimed in claim 4, wherein said entrance is disposed centrally of the tower, said bars being disposed in a series about the interior periphery of the lower portion of the tower outboard of said entrance.

6. Apparatus as claimed in claim 3, wherein said means for transferring slurry from said outlet to said inlet includes a conduit, said conduit having a plurality of internal projections disposed in the flow path of the slurry for impinging with the particles thereof.

* * * * *